United States Patent
Mortensen

[15] 3,641,866
[45] Feb. 15, 1972

[54] TUBULAR ANCHORING MEMBER

[72] Inventor: Louis Aackersberg Mortensen, Petersholm Hillerdvej 1, 3480 Fredensborg, Denmark

[22] Filed: Feb. 6, 1970

[21] Appl. No.: 9,276

[30] Foreign Application Priority Data

Feb. 7, 1969 Denmark..................................664/69

[52] U.S. Cl..........................................85/72, 85/61, 85/82
[51] Int. Cl..........................................................F16b 13/06
[58] Field of Search........................85/72, 61, 62, 82, 83, 84, 85/63

[56] References Cited

UNITED STATES PATENTS

| | | | |
|---|---|---|---|
| 1,136,638 | 4/1915 | Zifferer | 85/83 |
| 1,476,836 | 12/1923 | Pleister | 85/72 |
| 1,530,679 | 3/1925 | Lambert | 85/61 |
| 3,199,398 | 8/1965 | Weisz | 85/83 |

FOREIGN PATENTS OR APPLICATIONS

| | | | |
|---|---|---|---|
| 498,826 | 1/1939 | Great Britain | 85/72 |
| 908,912 | 10/1962 | Great Britain | 85/82 |
| 1,354,587 | 1/1964 | France | 85/83 |

*Primary Examiner*—Marion Parsons, Jr.
*Attorney*—Cushman, Darby & Cushman

[57] ABSTRACT

A tubular anchoring member, such as a dowel, an expansion bolt or the like for mounting in a bored hole and for cooperating with a screw, a bolt or a similar fastening member and having at one end a collar or flange connected to the said end of the tubular member by means of one or more breakable connecting parts. The said connecting part or parts extend(s) radially beyond the cross section of the tubular member and the inner edge of the collar or flange encircles an annular uncovered area of said cross section. When the tubular member is mounted in a bored hole in a wall with the flange abutting the outer surface thereof the flange or collar may conveniently be separated from the tubular member by exerting a pressure or a blowing action to the exposed or uncovered annular part of the end of the tubular member by means of a suitable tool.

5 Claims, 10 Drawing Figures

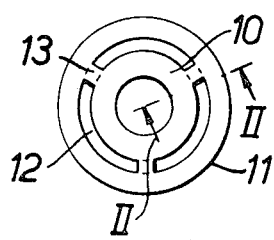
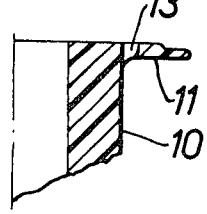
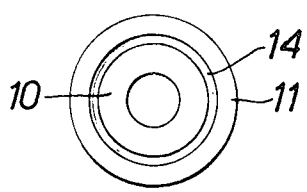
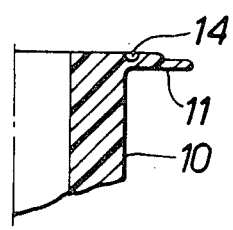
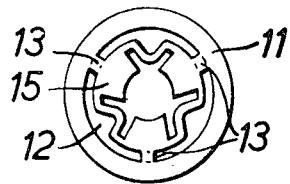
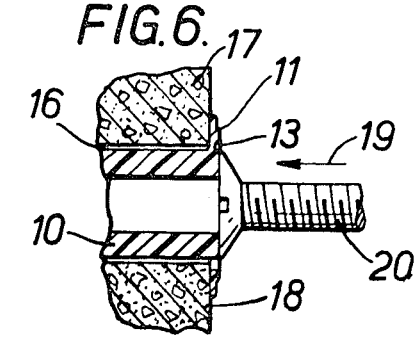

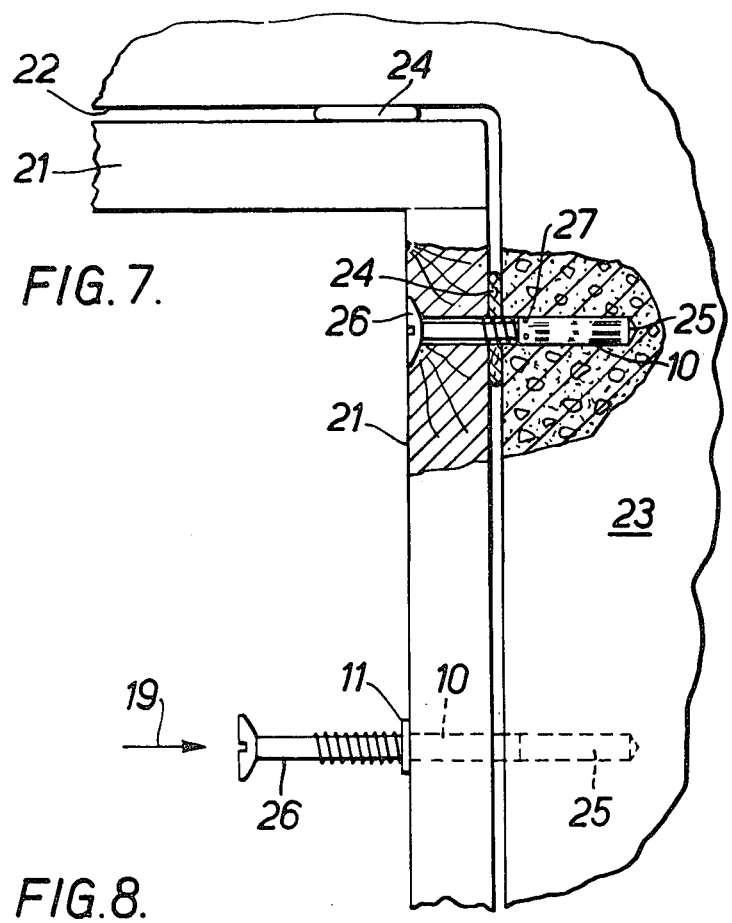
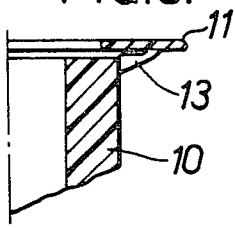
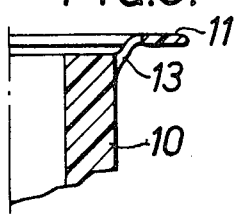

TUBULAR ANCHORING MEMBER

BACKGROUND OF THE INVENTION

1. Field of the Invention.

The invention relates to a tubular anchoring member of the type intended for mounting in a bored hole and for cooperating with a screw, a bolt, or a similar fastening member.

Typical examples of such anchoring members to which the invention relates, are the various types of wall screw anchors, or dowels, as well as sleeves or sleevelike parts used in connection with or constituting parts of the so-called expansion bolts. The said tubular anchoring members may be with or without axial slits and may be made from metal, plastic, or other suitable materials.

When an anchoring member of the above-mentioned type is to be mounted in a bored hole in most cases it is desired that in the mounted condition of the anchoring member the outmost end thereof is fairly made flush with the outer surface of the material in which the hole is bored, for example the outer surface of a wall or a plate. If the hole has been made a little oversized in relation to the outer diameter of the unexpanded anchoring member the said member is very easily moved too far into the hole if not provided with an abutting flange. Thereby in many cases the efficiency of the anchoring member is reduced unless the screw or bolt belonging to the anchoring member is replaced by a longer one. Furthermore, sometimes when the anchoring member is pushed too far into the bored hole there is a risk that the anchoring member falls down into an inaccessible wall cavity and thus becomes lost. In certain cases, however, it is desired to position the anchoring member at an arbitrary position along the axis of the bored hole. As an example, when mounting a door frame in a wall opening holes are bored through the door frame and into the wall. Then an anchoring member is pushed so deeply into the bored hole that it is positioned within the wall where the anchoring should take place, and then the anchoring operation is performed thereby that a relatively long screw is led into the bored hole and screwed into the anchoring member.

2. Description of the Prior Art.

In order to reduce the number of types of anchoring members which the dealers have to stock in order to cover the various needs it has for a long time been desired to produce a flanged tubular anchoring member which may when necessary, easily be modified by the user in such a manner that it may be pushed into the bored hole to any desired depth. Tubular plastic anchoring members which may be modified as described, are known. The flange of said known anchoring member is connected to one end of the tubular member by means of a number of spaced, axially extending connecting parts forming a continuation of the wall of the tubular member and being connected to the side of the annular flange facing said member and the inner diameter of the flange is equal to the diameter of the inscribed circular cylinder of the tubular member. Thus, by the known anchoring member the annular flange and the connecting parts define a cylindrical hole forming a direct continuation of the axial bore of the tubular member. If the said known anchoring member is to be mounted deeply in a bored hole the flange must initially be removed by cutting or shearing the connecting parts, for example by means of a wire cutter.

SUMMARY OF THE INVENTION

Generally the invention relates to an anchoring means intended for mounting in a bored hole and comprising a collar or flange connected to one end portion of a tubular member by means of one or more breakable connecting means, and the object of the invention is to provide an anchoring means the flange of which may be removed in a very simple manner without using cutting and shearing tools.

According to the invention the connecting means extend beyond the circumscribed circular cylinder of said end portion of the tubular member and the diameter of the inscribed circle of said collar or flange exceeds the diameter of the inscribed circular cylinder of the end portion of the tubular member.

If the anchoring means according to the invention is to be mounted deeper in the bored hole than allowed by the flange the anchoring means may be pushed into the bored hole in the normal manner till the collar or flange prevent further insertion. Due to the fact that the diameter of the inscribed circle of the flange is greater than the diameter of the inscribed circular cylinder of the end portion of the tubular member an annular part of the end surface of the tubular member will be exposed and this uncovered end part is now subjected to pressure or a slight blowing action. This may for example be performed thereby that the head of a screw belonging to the anchoring means is placed against the exposed annular end surface part whereafter a pressure or a slight blow is dealt to the opposite end of the screw, for example by means of a hammer or another blowing tool. Thereby the tubular member and the flange will be actuated in opposite directions and due to the fact that the interjacent connecting means extend radially beyond the cross section of the end portion of the anchoring means the breakable connecting means will be subjected to bending or shearing. Thus, the flange may easily be separated from the tubular member provided that the connecting means are suitably dimensioned.

According to the invention the diameter of the inscribed circle of the collar or flange may exceed the diameter of the said circumscribed cylinder of the end portion of the tubular member, and the connecting means may be circumferentially spaced connecting webs extending radially and substantially at right angles to the longitudinal axis of the tubular member. By this embodiment the whole end surface of the tubular member is uncovered and therefore it is particularly simple to subject the said end surface to the above mentioned blowing action. Furthermore, the fact that the connecting webs extend across an annular space between the end of the tubular member and the flange has the effect that the webs are easily cut by the mutual axial displacement taking place between the flange and the tubular member when the last mentioned is pushed or blown inwardly. The embodiments described above have a further advantage when the anchoring member is of the type adapted to be substantially radially expanded when a belonging screw or another belonging fastening member is mounted. The reason is that due to the interjacent webs the more stiff collar or flange will not prevent the radial expansion of the tubular member at the end thereof provided with the flange.

According to the invention each of said connecting webs may comprise a root portion being connected to said tubular member and having a cross section being increased in relation to that of the adjacent web portions. Thereby is obtained that the connecting means will not be cut right at the outer periphery of the tubular member. The outwardly extending root parts remaining on the tubular member will contribute to increase the friction between the tubular member and the wall of the bored hole. This is especially advantageous in cases where the bored hole has been slightly oversized in relation to the cross section of the anchoring member.

According to the invention said connecting part may be an annular part having a thickness being reduced in relation to the adjacent flange parts. When the exposed end of the tubular member of this embodiment is subjected to an axial blow as explained above the flange will be cut at the position where the thickness thereof is reduced.

BRIEF DESCRIPTION OF THE DRAWING

The invention will be further explained with reference to the drawing, wherein

FIG. 1 is a bottom view of an embodiment of the anchoring member according to the invention, FIG. 2 is an axial section along the line II—II in FIG. 1, FIG. 3 is a bottom view of another embodiment of the anchoring member according to the invention, FIG. 4 is an axial section corresponding to that shown in FIG. 2, but of the embodiment shown in FIG. 3, FIG. 5 is a screw anchoring member according to the invention and of the type being radially expandable along the whole length thereof, FIG. 6 illustrates a method for removing the collar or flange from a tubular member according to the invention mounted in a bored hole, FIG. 7 is a side view and partial section view of a portion of a door frame mounted in an opening in a wall by using the anchoring member according to the invention, and FIGS. 8–10 are axial sections corresponding to those shown in FIGS. 2 and 4, but of further embodiments of the anchoring member according to the invention.

DESCRIPTION OF THE PREFERRED EMBODIMENTS.

FIGS. 1 and 2 show an anchoring member or anchoring sleeve 10 representing all types of tubular anchoring members adapted to be mounted in a bored hole in order to permit fastening or anchoring of a screw, a bolt, or a similar fastening member. At one of its ends the sleeve 10 is provided with an annular collar or flange 11 the inner diameter of which is greater than the outer diameter or the diameter of the circumscribed circular cylinder of the adjacent end of the member or sleeve 10 so that an annular space 12 is formed between the sleeve and the flange. The collar or flange 11 is fastened to the outer surface of the sleeve 10 by means of mutually spaced, radially extending connecting webs 13.

In the embodiment shown in FIGS. 3 and 4 the annular flange 11 is connected to the tubular member or sleeve 10 by means of an annular connecting part 14 having a smaller wall thickness than the mere flange or collar 11.

FIG. 5 shows a screw anchoring member 15 of the type adapted to be expanded along its full length by screwing in a wooden screw. Due to the fact that an annular space 12 is present between the flange 11 and the member 15 the flange will not prevent expansion of the end of the anchoring member to which the flange is connected.

FIG. 6 illustrates the tubular member or sleeve shown in FIGS. 1 and 2 placed in a hole 16 bored in a wall 17. In most cases it is desired to have the flange 11 abut the outer wall surface 18 as shown. Sometimes, however, it is desired to remove the flange 11 from the sleeve 10, for example when the sleeve is to be moved further into the hole 16. This removal of the flange 11 may be performed thereby that the sleeve 10 is subjected to a pressure or a slight blowing action in the direction indicated by the arrow 19. As an example, the head of a screw 20 may be placed so as to abut the sleeve end as shown whereafter the opposite end of the screw may be subjected to a blow by a hammer or another tool. Then the connecting webs 13 will be sheared due to the shearing stress to which they are subjected. The flange of the embodiment shown in FIGS. 3 and 4 may be removed in a similar manner.

FIGS. 8, 9 and 10 show various other embodiments of the anchoring member according to the invention where the flange 11 is axially spaced from the adjacent end surface of the tubular member or sleeve 10 and where the connecting webs 13 extend in directions inclined in relation to the longitudinal axis of the anchoring member. In FIG. 8 the collar or flange 11 covers part of the adjacent end surface of the sleeve, and in FIG. 8 as well as in FIG. 9 the connecting webs are connected to the peripheral outer surface of the sleeve. In FIG. 10, however, the connecting webs are connected to the end surface of the sleeve.

As explained previously, for example when fastening a door frame in a wall opening by the use of screw anchoring members it is required to remove possible flanges thereon, the anchoring members have to be positioned deeply in the bored holes. FIG. 7 shows such a door frame 21 which is mounted in an opening 22 of a wall 23. The outer dimensions of the door frame 21 are normally somewhat smaller than the corresponding dimensions of the door opening, and therefore the door frame is initially fastened within the opening 22 by means of wooden wedges 24. Thereafter holes 25 are bored through the frame 21 and into the wall 23 and then anchoring members or sleeves according to the invention may be mounted in the holes 25 as shown at the bottom of FIG. 7 and in such a manner that the flange 11 of the sleeve abut the inner side of the frame 21. The flange 11 may now be separated from the sleeve 10 thereby that the mere sleeve is pushed or blown inwardly into the bored hole 25. This may for example be performed by using a screw 26 which may either be placed as the screw 20 in FIG. 6, or the point of the screw may be led into the sleeve 10 as shown at the bottom of FIG. 7 whereafter the screw is subjected to a blowing action in the direction indicated by the arrow 19. The anchoring sleeve 10 may then be pushed right to the bottom of the hole 25 in the wall 23 whereafter the screw 26 may be screwed up in the sleeve as shown at the top of FIG. 7. By using an anchoring member or sleeve 10 of the type shown in FIGS. 1, 2 and 5 where the root of the connecting webs 13 is strengthened these roots 27, FIG. 7, will remain on the sleeve after removal of the flange 11 and thus be effective as friction increasing members assisting in preventing that the sleeve rotates within the hole 25 when screwing up the screw 26.

It is understood that various modifications of the embodiments shown on the drawing may be made within the scope of the invention. As an example it may be mentioned that the connecting webs 13 need not extend radially. Furthermore, it should be noted that the outer and inner edges of the collar or flange 11 need not necessarily be circular.

What I claim is:

1. An anchoring means intended for mounting in a bored hole, said anchoring means comprising:

a tubular expandable member for receiving a fastening device designed to cause expansion of said expandable member in said bored hole, an annular collar or flange, and breakable connecting means connecting said annular flange to one end portion of said tubular expandable member, said breakable connecting means extending radially beyond the outside diameter of said end portion, to permit separation of said tubular flange from said tubular member by breakage of said connecting means and to facilitate expansion of said tubular member even if the flange remains attached, and wherein, the inside diameter of said annular collar or flange exceeds the inside diameter of said end portion of the tubular member whereby the inner periphery of the annular collar or flange encircles an exposed annular area of the adjacent end of the tubular member to facilitate breakage of the connecting means by selective application of force on said exposed annular area after insertion of said tubular member into the bored hole.

2. An anchoring means as in claim 1, wherein:

the inside diameter of the collar or flange exceeds the outside diameter of the said end portion of the tubular member, and said connecting means are circumferentially spaced, connecting webs extending radially and substantially at right angles to a longitudinal axis of the tubular member.

3. An anchoring means as in claim 2, wherein each of said connecting webs comprises a root portion connected to said end portion of the tubular member and having a cross section that is greater than that of other web portions adjacent said root portion.

4. An anchoring means as in claim 1, wherein said connecting means is an annular part of the collar or flange, said annular part having a thickness that is less than the adjacent flange parts.

5. An anchoring means as in claim 1 wherein said tubular expandable member comprises a screw fastening or anchoring device.

* * * * *